United States Patent
Mou et al.

(10) Patent No.: US 12,548,374 B2
(45) Date of Patent: Feb. 10, 2026

(54) METHOD AND SYSTEM FOR IDENTIFYING SLIDING DIRECTION OF HAND

(71) Applicant: OmniVision Sensor Solution (Shanghai) Co., Ltd, Shanghai (CN)

(72) Inventors: Xiaozheng Mou, Shanghai (CN); Zhiyao Yang, Shanghai (CN)

(73) Assignee: OmniVision Sensor Solution (Shanghai) Co., Ltd, Shanghai (CN)

( * ) Notice: Subject to any disclaimer, the term of this patent is extended or adjusted under 35 U.S.C. 154(b) by 294 days.

(21) Appl. No.: 18/226,815

(22) Filed: Jul. 27, 2023

(65) Prior Publication Data

US 2023/0368579 A1 Nov. 16, 2023

Related U.S. Application Data

(63) Continuation of application No. PCT/CN2021/075435, filed on Feb. 5, 2021.

(30) Foreign Application Priority Data

Feb. 2, 2021 (CN) .......................... 202110145828.6

(51) Int. Cl.
G06V 40/20 (2022.01)

(52) U.S. Cl.
CPC .................... G06V 40/28 (2022.01)

(58) Field of Classification Search
CPC ......... G06F 3/017; G06V 40/28; H04N 25/47
See application file for complete search history.

(56) References Cited

U.S. PATENT DOCUMENTS

| | | | |
|---|---|---|---|
| 2015/0030204 A1* | 1/2015 | Lee | G06T 7/246 382/103 |
| 2015/0302710 A1* | 10/2015 | Jin | H10F 39/802 348/155 |
| 2016/0093273 A1 | 3/2016 | Wang et al. | |
| 2020/0150773 A1* | 5/2020 | Son | G06F 3/167 |
| 2021/0152757 A1* | 5/2021 | Wakabayashi | G06V 10/22 |
| 2021/0279890 A1* | 9/2021 | Mou | G06F 18/22 |

FOREIGN PATENT DOCUMENTS

| | | | |
|---|---|---|---|
| CN | 106934333 A | 7/2017 | |
| CN | 106934334 A | 7/2017 | |
| CN | 108509853 A | 9/2018 | |
| CN | 109544590 A | 3/2019 | |
| CN | 111984347 A | 11/2020 | |
| CN | 111988493 A | 11/2020 | |
| WO | WO-2020107524 A1 * | 6/2020 | G06V 20/17 |

\* cited by examiner

*Primary Examiner* — Yuzhen Shen
(74) *Attorney, Agent, or Firm* — IPRO, PLLC; Na Xu

(57) ABSTRACT

The present disclosure provides a method and a system for identifying a sliding direction of a hand, a computing device and an intelligent device. The method includes: generating at least one time plane image in accordance with a series of event data from a dynamic vision sensor, each event being triggered in accordance with movement of an object relative to the dynamic vision sensor in a field of view; identifying a gesture in the time plane image; in the case that the identified gesture is a predetermined gesture, entering a hand sliding identification state; determining active pixels indicating the sliding of the hand in a corresponding time plane image in the hand sliding identification state; and determining the sliding direction of the hand in accordance with the active pixels.

12 Claims, 5 Drawing Sheets

METHOD AND SYSTEM FOR IDENTIFYING SLIDING DIRECTION OF HAND

TECHNICAL FIELD

The present disclosure relates to the field of data processing technology, in particular to a method and a system for identifying a sliding direction of a hand.

BACKGROUND

Along with the development of the computer vision technology and the popularization of intelligent devices (e.g., intelligent household electrical appliances, household robots, wearable devices, or children's educational toys), gesture identification has become a research focus in the computer science. A simple gesture is used by a user to control the device or interact with the device, without any physical touch. In this way, it is able to provide a more intelligent and natural human-machine interaction mode.

Currently, short-range gesture identification is most typically applied to a mobile terminal (e.g., a mobile phone or a tablet computer). For example, for some mobile phones, such an operation as scrolling, screenshotting or photographing is controlled through a gesture, so as to control the mobile phone in a scenario where it is inconvenient for the user to touch a screen. There mainly exist two kinds of schemes for the short-range gesture identification. In a first kind of scheme, the short-range gesture identification is performed on the basis of a traditional image sensor, i.e., key points of a hand are detected on an image and then the movement of the hand or a gesture type is determined in accordance with a positional relationship among the key points. In a second kind of scheme, the short-range gesture identification is performed on the basis of a millimeter-wave radar, i.e., the movement of the hand is analyzed in accordance with radar data. However, there are some drawbacks in the above-mentioned two kinds of schemes. In the first kind of scheme, a large computational burden and large power consumption occur, so a system response is slow and the user experience is adversely affected. In addition, when the hand moves too fast, a blurry image occurs, and the key points fail to be detected, i.e., it is impossible to identify the gesture or an identification error occurs. In the second kind of scheme, due to sparse data sources from the millimeter radar, it is merely able to identify through an algorithm some simple movements, e.g., side-to-side sliding, rather than any subtle gesture.

Hence, there is an urgent need to provide a new short-range gesture identification scheme.

SUMMARY

An object of the present disclosure is to provide a method and a system for identifying a sliding direction of a hand, so as to solve or at least alleviate at least one of the above-mentioned problems.

In one aspect, the present disclosure provides in some embodiments a method for identifying a sliding direction of a hand, including: generating at least one time plane image in accordance with a series of event data from a dynamic vision sensor, each event being triggered in accordance with movement of an object relative to the dynamic vision sensor in a field of view; identifying a gesture in the time plane image; in the case that the identified gesture is a predetermined gesture, entering a hand sliding identification state; determining active pixels indicating the sliding of the hand in a corresponding time plane image in the hand sliding identification state; and determining the sliding direction of the hand in accordance with the active pixels.

In a possible embodiment of the present disclosure, the determining the sliding direction of the hand in accordance with the active pixels includes: in the case that the quantity of active pixels is within a predetermined numerical range, calculating an average pixel position of the active pixels; determining a variance and a deviation direction of the average pixel position in accordance with a current time plane image and a predetermined quantity of consecutive time plane images before the current time plane image; and determining the sliding direction of the hand in accordance with the variance and the deviation direction.

In a possible embodiment of the present disclosure, the determining the active pixels indicating the sliding of the hand in the corresponding time plane image in the hand sliding identification state includes: calculating a movement speed of each pixel in the corresponding time plane image in the hand sliding identification state; and determining the active pixels in accordance with the movement speed of each pixel, the active pixels being used to indicate the sliding of the hand.

In a possible embodiment of the present disclosure, the calculating the movement speed of each pixel in the corresponding time plane image includes determining the movement speed of each pixel in accordance with a pixel value of a pixel adjacent to the pixel.

In a possible embodiment of the present disclosure, the determining the variance and the deviation direction of the average pixel position in accordance with the current time plane image and the predetermined quantity of consecutive time plane images before the current time plane image includes: determining the variance in accordance with a difference between an average pixel position in the predetermined quantity of consecutive time plane images and an average pixel position in the current time plane image; dividing the predetermined quantity of consecutive time plane images into two parts; and determining the deviation direction in accordance with a different between a sum of the average pixel positions in a first part of the time plane images and a sum of the average pixel positions in a second part of the time plane images.

In a possible embodiment of the present disclosure, the determining the sliding direction of the hand in accordance with the variance and the deviation direction includes: in the case that a variance in a X-axis direction is greater than a variance in a Y-axis direction and a deviation direction relative to the X-axis direction is greater than a first predetermined value, determining that the hand slides to left; in the case that the variance in the X-axis direction is greater than the variance in the Y-axis direction and the deviation direction relative to the X-axis direction is smaller than a negative value of the first predetermined value, determining that the hand slides to right; in the case that the variance in the X-axis direction is smaller than the variance in the Y-axis direction and a deviation direction relative to the Y-axis direction is greater than a second predetermined value, determining that the hand slides upward; and in the case that the variance in the X-axis direction is smaller than the variance in the Y-axis direction and a deviation direction relative to the Y-axis direction is smaller than the second predetermined value, determining that the hand slides downward.

In a possible embodiment of the present disclosure, subsequent to entering the hand sliding identification state, the method further includes, in the case that the sliding direction of the hand is not determined within a predetermined time period, returning to a gesture identification state and identifying the gesture again.

In a possible embodiment of the present disclosure, the identifying the gesture in the time plane image includes: processing pixels in the time plane image so as to obtain a processed image; and identifying the gesture in the processed image.

In a possible embodiment of the present disclosure, the event data includes a coordinate position and a timestamp of each triggered event. The generating the at least one time plane image in accordance with a series of event data from the dynamic vision sensor includes: creating an initialization image for each piece of event data; searching for a coordinate position of each triggered event in the piece of event data in the initialization image; and updating a pixel value of the coordinate position in accordance with a timestamp of the triggered event so as to generate the time plane image.

In a possible embodiment of the present disclosure, the predetermined numerical range is associated with a resolution of the time plane image.

In another aspect, the present disclosure provides in some embodiments a computing device, including one or more processor, a memory, and one or more programs stored in the memory. The one or more programs is executed by the one or more processors so as to implement the above-mentioned method.

In yet another aspect, the present disclosure provides in some embodiments a computer-readable storage medium storing therein one or more programs. The one or more programs is executed by the one or more processors so as to implement the above-mentioned method.

In still yet another aspect, the present disclosure provides in some embodiments a system for identifying a sliding direction of a hand, including the above-mentioned computing device, and a dynamic vision sensor coupled to the computing device, and configured to trigger an event in accordance with movement of an object relative to the dynamic vision sensor and output an event data flow to the computing device.

In still yet another aspect, the present disclosure provides in some embodiments an intelligent device, including the above-mentioned system.

According to the embodiments of the present disclosure, through the event data from the dynamic vision sensor, it is able to rapidly identify the gesture and the sliding direction of the hand using an algorithm with low computility.

BRIEF DESCRIPTION OF THE DRAWINGS

In order to achieve the above and related objects, some descriptive aspects will be described in conjunction with the following description and drawings, and these aspects indicate various ways capable of practicing a principle of the present disclosure. All aspects and equivalent aspects thereof shall fall within the scope of the present disclosure. The above and other objects, features and advantages will become more apparent on the basis of the drawings in conjunction with the following description. Same reference signs represent a same component or element.

DETAILED DESCRIPTION

The present disclosure will be described hereinafter in more details in conjunction with the drawings and embodiments. The following embodiments are for illustrative purposes only, but shall not be used to limit the scope of the present disclosure. In contrast, the following embodiments are provided so as to facilitate the understanding of the present disclosure.

Recently, a Dynamic Vision Sensor (DVS) has attracted more and more attentions in the field of computer vision technology. The DVS is a biologically-mimic vision sensor for simulating a pulse-triggered neuron-based human retina, and it is provided with an array consisting of a plurality of pixel units. Each pixel unit may respond to and record an area where a light intensity changes rapidly merely when a light intensity change has been sensed. In other words, each pixel unit in the DVS independently responds to and records the area where the light intensity changes rapidly. An event-triggered processing mechanism is adopted by the DVS, so it may output an asynchronous event data flow. The event data flow may be, for example, light intensity change information (e.g., a timestamp of the light intensity change and a light intensity threshold) and a coordinate position of a triggered pixel unit.

Based on the above-mentioned operating principle, it is found that, as compared with a conventional vision sensor, the DVS has the following advantages. 1) The DVS is capable of detecting a high-speed object moving at a speed of up to ten thousand frames per second, without any restraint from an exposure time and a frame rate. 2) The DVS has a larger dynamic range, and it is capable of accurately sensing and output a scenario change even in a low-light or highly-exposed environment. 3) The DVS has lower power consumption. 4) Each pixel unit in the DVS responds to the light intensity change independently, so the DVS is not affected by motion blur.

An object of the present disclosure is to provide a DVS-based scheme for identifying a gesture within a short range (0.1 m to 1 m), more specifically for identifying a sliding direction of a hand. Considering defects in an existing gesture identification scheme, the DVS is adopted due to such characteristics as low data redundancy, rapid response and being not affected by motion blur, and an event data flow from the DVS is processed through an algorithm so as to rapidly identify a gesture type and the sliding direction of the hand, thereby to reduce the computational burden and the power consumption, and increase the accuracy and the response speed.

Figure 1:
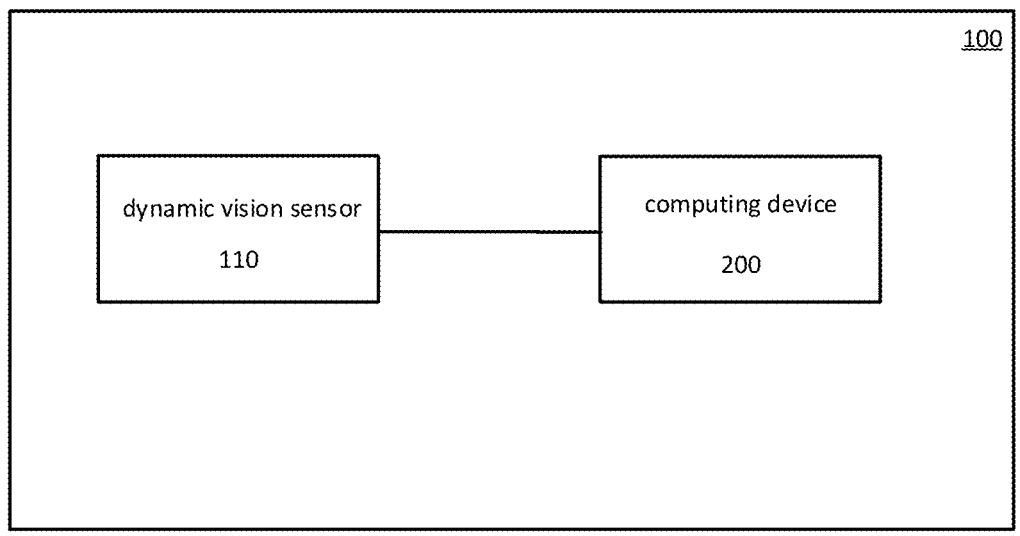
FIG. 1 is a schematic view showing a system for identifying a sliding direction of a hand according to one embodiment of the present disclosure.

FIG. 1 shows a system 100 for identifying a sliding direction of a hand according to one embodiment of the present disclosure. As shown in FIG. 1, the system 100 includes a DVS 110 and a computing device 200 coupled to each other. It should be appreciated that, FIG. 1 is for illustrative purposes only, and the quantity of DVSs and computing devices in the system 100 will not be particularly defined herein.

The DVS 110 monitors in real time a change in movement of an object in a field of view. Once the object moves in the field of view relative to the DVS 110 (i.e., light in the field of view changes), a pixel event (also called as event for short) is triggered, and then the DVS outputs event data about a dynamic pixel (i.e., a pixel unit whose brightness changes). Several pieces of event data outputted within a certain time period form an event data flow. Each piece of event data in the event data flow at least includes a coordinate position of the triggered event (i.e., the pixel unit whose brightness changes) and timestamp information about a time when the event is triggered. A specific structure of the DVS 110 will not be particularly defined herein.

The computing device 200 receives the event data flows from the DVS 110, and processes the event data flows so as to identify the sliding direction of the hand. Then, the system 100 responds to the sliding direction of the hand.

Figure 3:
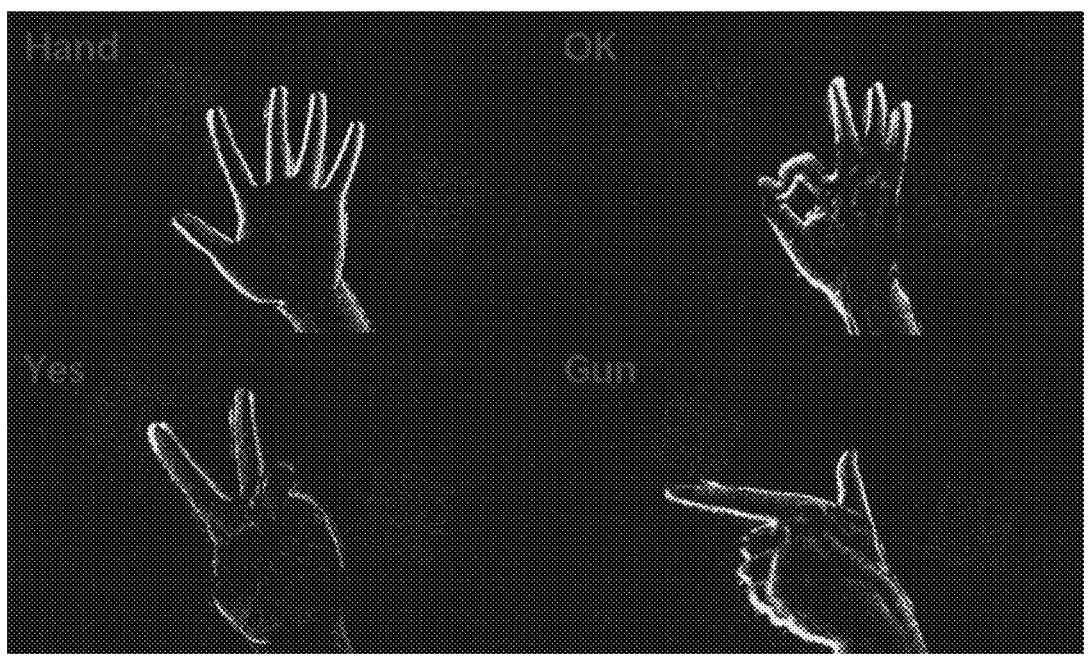
FIG. 3 is a schematic view showing gesture identification results according to one embodiment of the present disclosure.

In the embodiments of the present disclosure, when the system 100 is started, it enters a gesture identification state, and the computing device 200 identifies the gesture in accordance with the event data flow. For example, the gesture includes one of hand, OK, YES, bowing or thumbs-up. FIG. 3 shows some gestures, and of course, the gestures are not limited thereto. When the identified gesture is a predetermined gesture (e.g., hand), the system 100 enters a hand sliding identification state. In this state, the system 100 determines the sliding direction of the hand in accordance with the event data flow. In the embodiments of the present disclosure, the sliding direction includes one of a direction in which the hand slides to the left, a direction in which the hand slides to the right, a direction in which the hand slides upward, or a direction in which the hand slides downward.

In addition, when the system 100 is in the hand sliding identification state and fails to determine the sliding direction within a certain time period, the system 100 determines that a user has stopped a sliding operation. At this time, the system 100 returns to the gesture identification state, and identifies the gesture in accordance with a newly-received event data flow. In the system 100, the identification of the gesture and the identification of the sliding direction are not performed simultaneously. In other words, when the system 100 is in the gesture identification state, it does not identify the sliding direction of the hand, and when the system 100 is in the hand sliding identification state, it does not identify the gesture, so as to meet the requirement on a user's habit as well as the system stability.

On one hand, usually a terminal is controlled by the user through either a gesture or a sliding operation, because different responses are provided by the terminal for the gesture and the sliding operation. On the other hand, when a sliding operation is made by different users, gestures of hands of the users may be different. At this time, the identification of the sliding direction may not be adversely affected by the different gestures, so as to prevent the identification of the gesture from being triggered erroneously when the predetermined gesture is identified. Similarly, when the identification of the gesture is performed, the user's hand may move in different ways. In the embodiments of the present disclosure, in the gesture identification state, the system 100 does not provide any undesired response due to the movement of the hand.

Usually, the system 100 is applied to an intelligent device which is to be controlled within a short range through contactless gestures, so as to improve the user experience.

The intelligent device includes a general-purpose device, e.g., a mobile terminal or a personal digital terminal. At this time, one or more systems 100 is used for interaction, or for controlling peripherals of the intelligent device.

The intelligent device further includes a specific-purpose device, e.g., an intelligent loudspeaker box, or an intelligent display device. At this time, the system 100 is used for controlling the intelligent device.

The intelligent device further includes various Internet of Things (IoT) devices or Artificial Intelligence and Internet of Things (IoT) devices. At this time, the system 100 is used for interaction, so as to achieve the distribution of the devices in a more intensive and more intelligent manner.

The intelligent device is used in a vehicle as a vehicle-mounted device for intelligent driving.

The intelligent device is further used in household appliances or entertainment devices, e.g., an intelligent loudspeaker box, an intelligent air conditioner, an intelligent refrigerator or an intelligent display device. At this time, the system 100 is used for interaction and controlling.

In addition, the intelligent device is also used in the industrial field, e.g., industrial control equipment, a sensing device, an IoT device, an IoT device or a braking device. At this time, the system 100 is sued for interaction and controlling.

The above description about the intelligent device is for illustrative purposes only, and the intelligent device is not limited thereto, i.e., all the intelligent devices having an interaction processing capability of a data processing capability through the system fall within the scope of the present disclosure.

Figure 2:
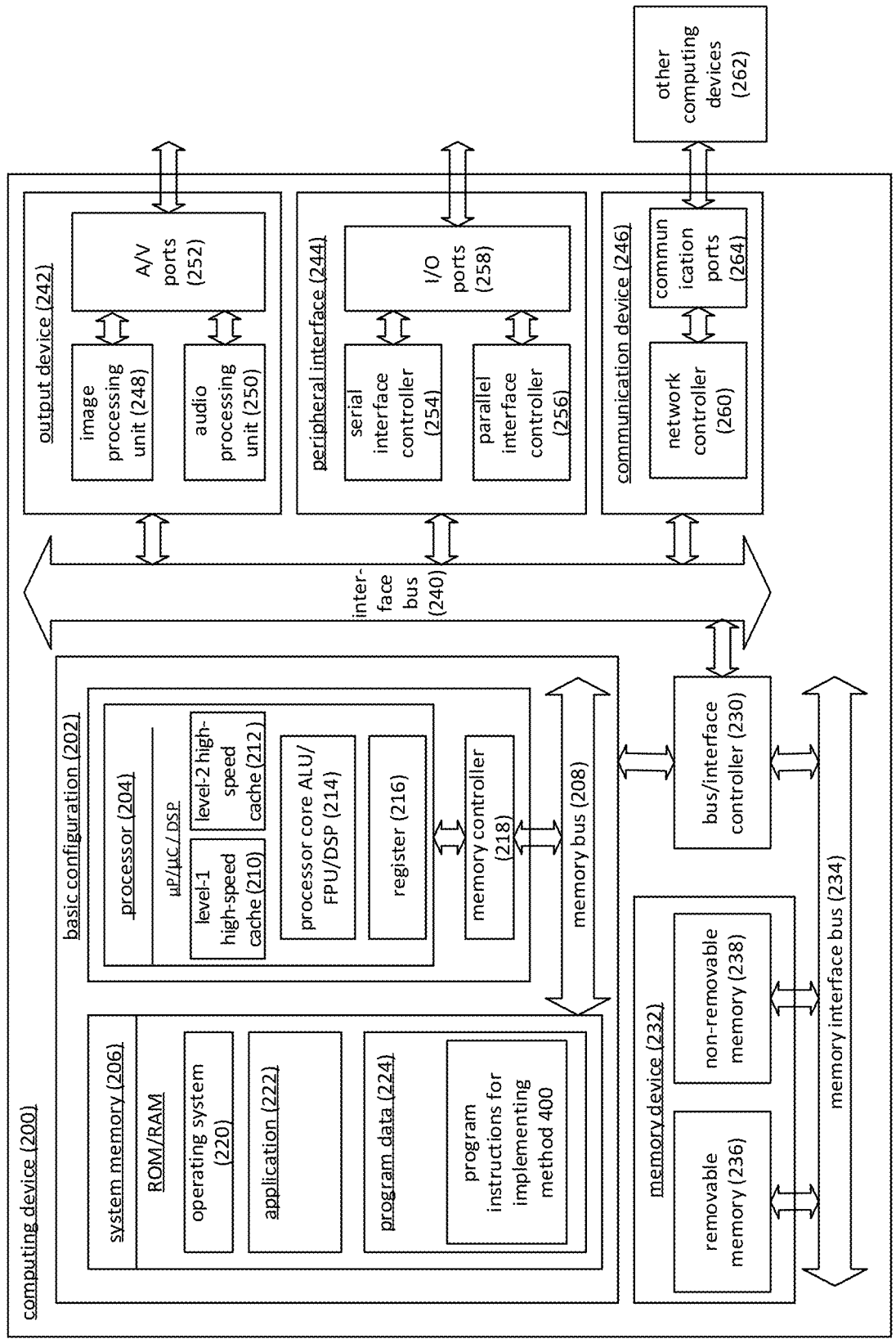
FIG. 2 is a schematic view showing a computing device according to one embodiment of the present disclosure.

As shown in FIG. 2, the present disclosure provides in some embodiments a computing device 200.

As shown in FIG. 2, in a basic configuration 202, the computing device 200 typically includes a system memory 206 and one or more processors 204. The one or more processors 204 communicates with the system memory 206 via a memory bus 208.

Depending on a desired configuration, the processor 204 may be of any type, and it may include, but not limited to, microprocessor (μP), microcontroller (μC), Digital Signal Processor (DSP), or a combination thereof. The processor 204 may include one or more levels of high-speed caches (e.g., a level-1 high-speed cache 210 and a level-2 high-speed cache 212), a processor core 214 and a register 216. The processor core 214 may include an Arithmetic Logical Unit (ALU), a Float Point Unit (FPU), a DSP core, or a combination thereof. A memory controller 218 may be used together with the processor 204, or in some embodiments of the present disclosure, the memory controller 218 may be an internal component of the processor 204.

Depending on a desired configuration, the system memory 206 may be of any type, and it may include, but not limited to, volatile memory (e.g., Random Access Memory (RAM)), non-volatile memory (e.g., Read Only Memory (ROM) or flash memory), or a combination thereof. The system memory 206 may include an operating system 220, one or more applications 222, and program data 224. In some embodiments of the present disclosure, the application 222 may be operated using the program data 224 on the operating system.

The computing device 200 further includes a storage device 232, which includes a removable memory 236 and an unremovable memory 238 coupled to each other via a memory interface bus 234.

The computing device 200 may further include an interface bus 240 for the communication between various interface devices (e.g., an output device 242, a peripheral interface 244 and a communication device 246) and the basic configuration 102 via a bus/interface controller 230. The output device 242 may include a graphical processing unit 248 and an audio processing unit 250, which are configured to facilitate the communication with various external devices, e.g., display and loudspeaker, via one or more A/V ports 152. The peripheral interface 244 may include a serial interface controller 254 and a parallel interface controller 256, which are configured to facilitate the communication with the external devices, such as input devices (e.g., keyboard, mouse, stylus, voice input device and touch device) or the other devices (e.g., printer or scanner) via one or more I/O ports 258. The communication device 246 may include a network controller 260, which is configured to communicate with one or more other computing devices 262 using a network communication link via one or more communication ports 264.

The network communication link may be an instance of a communication medium. Usually, the communication medium may be embodied as a computer-readable instruction, data structure or program module in a modulated data signal such as carrier or the other transmission mechanism, and it may include any information delivery medium. For the so-called modulated data signal, one or more data sets of the modulated data signal or the modulated data signal itself may be changed through encoding information in a signal. As a non-restrictive example, the communication medium may include a wired medium (e.g., wired network or private wire network), or a wireless medium (e.g., sound, Radio Frequency (RF), microwave, infrared (IR) or the like). The term "computer-readable medium" may include both the memory medium and the communication medium.

Usually, the computing device 200 may be a part of a small-size portable (or mobile) electronic device, e.g., cellular phone, digital camera, PDA, Personal Media Player, wireless network browser, head-mounted device, application-specific device, or a device including the above functions. In a possible embodiment of the present disclosure, the computing device 200 may be a micro computing module, which will not be particularly defined herein.

In the embodiments of the present disclosure, the computing device 200 is configured to implement a method 400 for identifying a sliding direction of a hand. The application 222 in the computing device 200 includes a plurality of program instructions for implementing the method 400.

Figure 4:
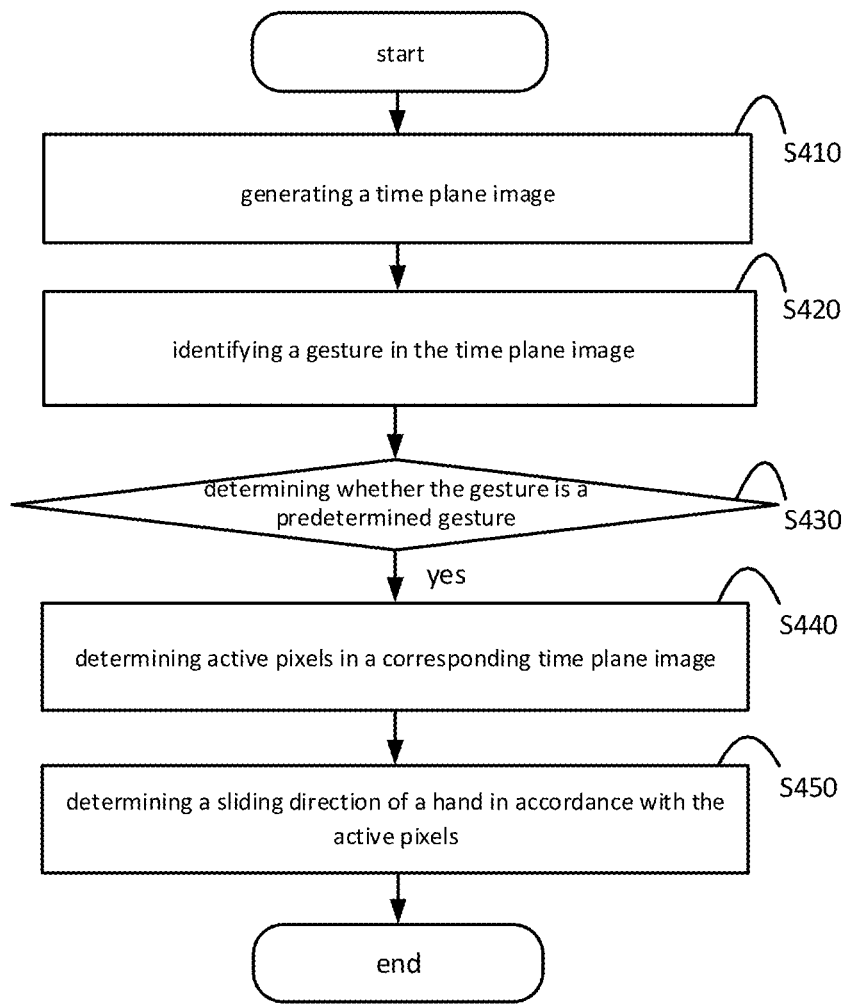
FIG. 4 is a flow chart of a method for identifying a sliding direction of a hand according to one embodiment of the present disclosure.

FIG. 4 shows the method 400 for identifying the sliding direction of the hand, and the method 400 is executed by the computing device 200. It should be appreciated that, the implementation of the method 400 may refer to that of the system 100, which will not be particularly defined herein.

As shown in FIG. 4, the method 400 includes the following steps.

Step S410: generating at least one time plane image in accordance with a series of event data from a dynamic vision sensor 110. As mentioned hereinabove, each event is triggered in accordance with movement of an object relative to the dynamic vision sensor 110 in a field of view. The event data outputted by the dynamic vision sensor 110 includes a coordinate position and a timestamp of the triggered event.

In a possible embodiment of the present disclosure, the time plane image is generated as follows. At first, an event data flow is divided into a plurality of pieces of event data, and an initialization image is created for each piece of event data. In the initialization image, a pixel value of each pixel is 0. Next, a coordinate position of each triggered event in the piece of event data is searched in the initialization image. Then, the pixel value at the coordinate position is updated in accordance with the timestamp of the triggered event. An image obtained after the pixel values of all the triggered events have been updated is just the time plane image. The time plane image is expressed as $I_T(x, y)=t$ (1), where $(x, y)$ represents the coordinate position of the triggered event (i.e., a pixel position of the event data), $I_T(x, y)$ represents a pixel value of a pixel $(x, y)$, and t represents the timestamp of the event data.

In a possible embodiment of the present disclosure, when there is a plurality of pieces of event data at a same pixel, a timestamp at a moment closest to a current moment is taken as a pixel value of the pixel.

According to the embodiments of the present disclosure, the time plane image represents the movement of the object in the field of view, and the event data merely indicates the pixel where the light intensity changes, so as compared with a traditional image, it is able to remarkably reduce the interference from background information, thereby to reduce the redundancy.

Step S420: identifying a gesture in the time plane image.

In a possible embodiment of the present disclosure, the event data flow is outputted at a nanosecond level, so most of the pixel values in the time plane image are floating-point data. Before the identification of the gesture, the pixels in the time plane image are processed to obtain a processed image, and then the gesture is identified in the processed image.

To be specific, the pixel values are mapped to a predetermined range (a predetermined, shaped region), so as to save memory and improve the calculation efficiency subsequently. In a possible embodiment of the present disclosure, the pixel values of the generated time plane image are mapped to [0, 255] so as to obtain a grayscale image similar to a conventional image, and each pixel value is marked as $I_G$.

It should be appreciated that, the predetermined range [0, 255] is for illustrative purposes only, and the timestamp may be mapped to any predetermined range, which will not be particularly defined herein.

In a possible embodiment of the present disclosure, a processed image is expressed through $$I_G(x, y) = \left[ \frac{t - t_{min}}{t_{max} - t_{min}} \times 255 \right], \quad (2)$$

where $I_G(x, y)$ represents a pixel value of a pixel $(x, y)$ in the processed image, $t_{max}$ and $t_{min}$ represent a maximum pixel value and a minimum pixel value in the time plane image, t represents a pixel value at the pixel $(x, y)$, and [•] represents a rounding function.

The gesture may be identified using a conventional image algorithm through an object detection model or a classification network, e.g., YOLO, SSD, MobileNet or SequeezeNet, which will not be particularly defined herein. Any known or future gesture identification algorithm may be used to identify the gesture within a short range.

Different from a conventional Contact Image Sensor (CIS) image, the input image $I_G$ does not include all scenario information, and instead, it merely includes most important information for identifying the gesture (i.e., a contour of the hand) generated due to the change in the light intensity. Hence, as compared with a conventional gesture identification scheme, it is able to prevent the interference caused by the redundancy information, e.g., the background information, to the greatest extent, thereby to improve the identification accuracy and speed.

FIG. 3 shows identification results of the gestures, i.e., Hand, OK, Yes and Gun.

Step S430: determining whether the identified gesture is a predetermined gesture; entering a hand sliding identification state in the case that the identified gesture is the predetermined gesture, and proceeding to Step S440; and in the case that the identified gesture is not the predetermined gesture, returning to Step S410 to generate the time plane image and identify the gesture in the time plane image.

In the embodiments of the present disclosure, the predetermined gesture is set in the system 100 in advance. For example, when the predetermined gesture is Hand and the identified gesture is Hand too, it enters the hand sliding identification state.

In addition, in some embodiments of the present disclosure, more than one predetermined gesture is set, and the predetermined gestures correspond to different operations. For example, the predetermined gesture Hand corresponds to a page-turning operation, and the predetermined gesture OK corresponds to a photographing operation. When the identified gesture is Hand, it enters the hand sliding identification state, so as to determine the sliding direction of the hand. Then, the system 100 performs a paging-left operation, a paging-right operation, a paging-up operation or a paging-down operation in accordance with the sliding direction. When the identified gesture is OK, it enters the hand sliding identification state so as to determine the sliding direction of the hand. Then, a camera moves in accordance with the sliding direction to take a photo. It should be appreciated that, the above description is for illustrative purposes only, and the predetermined gestures are not limited thereto.

Step S440: determining active pixels indicating the sliding of the hand in a corresponding time plane image in the hand sliding identification state.

In a possible embodiment of the present disclosure, in the hand sliding identification state, the active pixels indicating the sliding of the hand are determined in two steps.

In a first step, a movement speed of each pixel in the time plane image is calculated. In the embodiments of the present disclosure, merely the movement speed of the pixel whose pixel value is not zero in the time plane image is calculated. To be specific, the movement speed of each pixel is determined in accordance with a pixel value of an adjacent pixel. In a possible embodiment of the present disclosure, the movement speed of a pixel in a horizontal direction is determined in accordance with pixel values of two pixels adjacent to the pixel in the horizontal direction (i.e., an X-axis direction), and the movement speed of the pixel in a longitudinal direction is determined in accordance with pixel values of two pixels adjacent to the pixel in the longitudinal direction (i.e., a Y-axis direction).

For example, the movement speeds of each pixel are calculated through $$v_x = \left| \frac{2}{I_T(x+1, y) - I_T(x-1, y)} \right| \text{ and} \quad (3)$$

$$v_y = \left| \frac{2}{I_T(x, y+1) - I_T(x, y-1)} \right|, \quad (4)$$

where $v_x$ and $v_y$ represent the movement speeds of the pixel (x, y) in the X-axis direction and the Y-axis direction respectively, $I_T(x, y)$ represents the pixel value of the pixel (x, y) in the time plane image, $I_T(x+1, y)$ and $I_T(x-1, y)$ represent pixels adjacent to the pixel (x, y) in the X-axis direction, $I_T(x, y+1)$ and $I_T(x, y-1)$ represent pixels adjacent to the pixel (x, y) in the Y-axis direction, and |•| represents an absolute value function.

In a second step, the active pixels are determined in accordance with the movement speed of each pixel. In a possible embodiment of the present disclosure, when a movement speed of a pixel in each of the X-axis direction and the Y-axis direction meets a predetermined condition, the pixel is determined as an active pixel. In other words, merely a pixel whose movement speed reaches a certain value is determined as an active pixel. When the hand moves slowly, the system 100 may not determine the sliding direction. Through the active pixels, it is able to prevent the occurrence of any misoperation caused by undesired sliding or the background.

In a possible embodiment of the present disclosure, the active pixel is determined through $v_x \in (V_{x0}, V_{x1})$ (5) and $v_y \in (V_{y0}, V_{y1})$ (6), where $V_{x0}$, $V_{x1}$, $V_{y0}$, $V_{y1}$ are preset thresholds of the movement speeds in the X-axis direction and the Y-axis direction. For example, the movement speed in each of the X-axis direction and the Y-axis direction is within a range of, but not limited to, (500 pix/s, 5000 pix/s). In actual use, the range may be set with reference to a movement speed of the hand.

Step S450: determining the sliding direction of the hand in accordance with the active pixels.

In a possible embodiment of the present disclosure, the quantity of active pixels is determined at first. When the quantity of active pixels is within a predetermined range, the sliding direction of the hand is determined, and when the quantity of active pixels is not within the predetermined range, Step S410 is performed again.

In a possible embodiment of the present disclosure, the predetermined range is associated with a resolution of the time plane image. Usually, the predetermined range is in direct proportion to the resolution. When the resolution is one million pixels per inch, the quantity of active pixels is within 100 to 200000. For an image with a lower resolution, the quantity of active pixels may be reduced proportionally. The predetermined range is for illustrative purposes only. It should be appreciated that, the predetermined range mainly depends on a size of a hand image in the time plane image and the quantity of pixels relative to the movement.

To be specific, the sliding direction of the hand is determined as follows.

1) An average pixel position of the active pixels is calculated through $$\bar{X} = \frac{1}{N} \sum_{i=1}^{N} x_i \text{ and} \quad (7)$$

$$\bar{Y} = \frac{1}{N} \sum_{i=1}^{N} y_i, \quad (8)$$

where $\bar{X}$ and $\bar{Y}$ represent average pixel positions of all the active pixels in the X-axis direction and the Y-axis direction respectively, N represents the quantity of active pixels, and $x_i$, $y_i$ represent a position of an $i^{th}$ active pixel.

2) A variance and a deviation direction of the average pixel position are determined in accordance with a current time plane image and a predetermined quantity of consecutive time plane images before the current time plane image. To be specific, the variance and the deviation direction of the average pixel position in the X-axis direction and the Y-axis direction are calculated in accordance with an average pixel position in the current time plane image and an average pixel position in a predetermined quantity (m) of consecutive time plane images before the current time plane image.

For ease of description, a set of the average pixel positions in the consecutive (m+1) time plane images includes average pixel positions $\{X_{-m}, \ldots, X_{-2}, X_{-1}, X\}$ in the X-axis direction and average pixel positions $\{Y_{-m}, \ldots, Y_{-2}, Y_{-1}, Y\}$ in the Y-axis direction. In a possible embodiment of the present disclosure, m is 5 to 9. In other words, the variance and deviation direction of the average pixel position in the current time plane image are calculated in accordance with the average pixel positions in 6 to 10 time plane images.

The variance is calculated in accordance with a difference between the average pixel position in each of the m time plane images and the average pixel position in the current time plane image.

For example, the variances in the X-axis direction and the Y-axis direction are calculated through $$\delta_x^2 = \frac{(\bar{X}_{-m} - \hat{X})^2 + \ldots + (\bar{X}_{-2} - \hat{X})^2 + (\bar{X}_{-1} - \hat{X})^2 + (\bar{X} - \hat{X})^2}{m+1} \text{ and} \quad (9)$$

$$\delta_y^2 = \frac{(\bar{Y}_{-m} - \hat{Y})^2 + \ldots + (\bar{Y}_{-2} - \hat{Y})^2 + (\bar{Y}_{-1} - \hat{Y})^2 + (\bar{Y} - \hat{Y})^2}{m+1}, \quad (10)$$

where $\delta_x^2$ and $\delta_y^2$ represent the variances in the X-axis direction and the Y-axis direction respectively, and $\hat{X}$ and $\hat{Y}$ represent average values of $\{X_{-m}, \ldots, X_{-2}, X_{-1}, X\}$ and $\{Y_{-m}, \ldots, Y_{-2}, Y_{-1}, Y\}$ respectively.

When calculating the deviation direction, usually the consecutive (m+1) time plane images are divided into two parts, i.e., a first part including the time plane images related to $$\left\{\bar{X}_{-m}, \bar{X}_{-m+1}, \ldots, \bar{X}_{\frac{-m-1}{2}}\right\},$$

and a second part including the time plane images related to $$\left\{\bar{X}_{\frac{-m+1}{2}}, \ldots, \bar{X}_{-1}, \bar{X}\right\}.$$

The deviation direction is determined in accordance with a difference between a sum of the average pixel positions in the first part of the time plane images and a sum of the average pixel positions in the second part of the time plane images. To be specific, the sum of the average pixel positions in each part of the time plane images is calculated, and then the difference is calculated as the deviation direction.

For example, the deviation directions in the X-axis direction and the Y-axis direction are calculated through $$D_x = \bar{X}_{-m} + \bar{X}_{-m+1} + \ldots + \bar{X}_{\frac{-m-1}{2}} - \left(\bar{X}_{\frac{-m+1}{2}} + \ldots + \bar{X}_{-1} + \bar{X}\right) \quad (11)$$

$$D_y = \left(\bar{Y}_{-m} + \bar{Y}_{-m+1} + \ldots + \bar{Y}_{\frac{-m-1}{2}}\right) - \left(\bar{Y}_{\frac{-m+1}{2}} + \ldots + \bar{Y}_{-1} + \bar{Y}\right), \quad (12)$$

where $D_x$ and $D_y$ represent the deviation directions in the X-axis direction and the Y-axis direction respectively.

3) The sliding direction of the hand is determined in accordance with the variance and the deviation direction.

In a possible embodiment of the present disclosure, the sliding directions of the hand includes a right-to-left direction, a left-to-right direction, a bottom-to-top direction and a top-to-bottom direction. When the variance in the X-axis direction is greater than the variance in the Y-axis direction and the deviation direction in the X-axis direction is greater than a first predetermined value, i.e., $\delta_x^2 > \delta_y^2$ and $D_x > \theta_x$, the hand is determined to slide to the left. When the variance in the X-axis direction is greater than the variance in the Y-axis direction and the deviation direction in the X-axis direction is smaller than a negative value of the first predetermined value, i.e., $\delta_x^2 > \delta_y^2$ and $D_x < -\theta_x$, the hand is determined to slide to the right. When the variance in the X-axis direction is smaller than the variance in the Y-axis direction and the deviation direction in the X-axis direction is greater than a second predetermined value, i.e., $\delta_x^2 < \delta_y^2$ and $D_y > \theta_y$, the hand is determined to slide upward. When the variance in the X-axis direction is smaller than the variance in the Y-axis direction and the deviation direction in the X-axis direction is smaller than a negative value of the second predetermined value, i.e., $\delta_x^2 < \delta_y^2$ and $D_y < -\theta_y$, the hand is determined to slide downward.

The first predetermined value and the second predetermined value are positive values. Usually, $\theta_x$ is 1/5 to 1/3 of a width of the time plane image, and $\theta_y$ is 1/5 to 1/3 of a height of the time plane image. In a possible embodiment of the present disclosure, $\theta_x = W/4$ and $\theta_y = H/4$, where W and H represent the width and height of the time image plane respectively.

Figure 5:
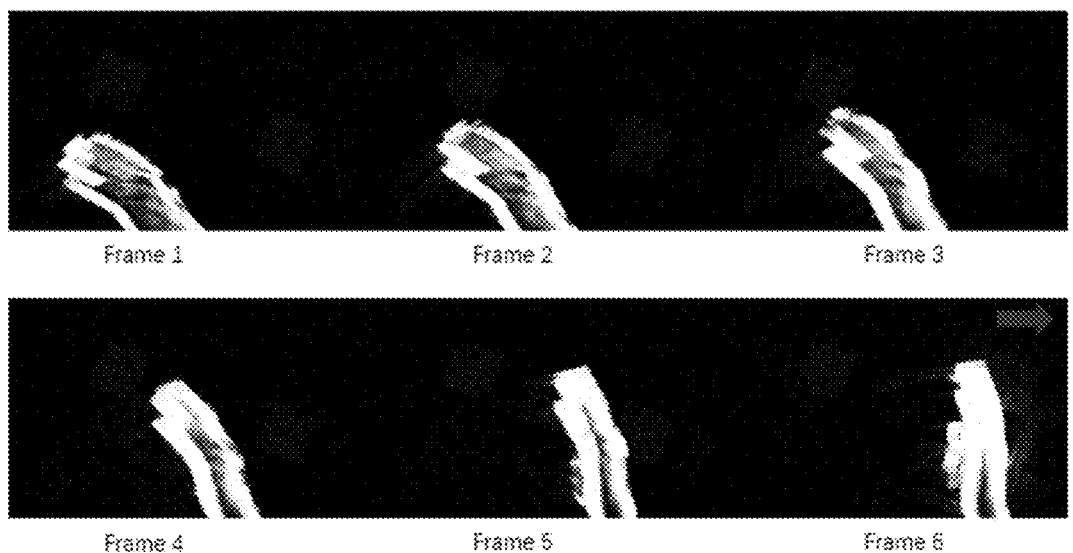
FIG. 5 is a schematic view showing a situation where the sliding direction of the hand is determined according to one embodiment of the present disclosure.

FIG. 5 shows how to determine the sliding direction of the hand. As shown in FIG. 5, six consecutive time plane images are adopted, i.e., Frame1, Frame2, Frame3, Frame4, Frame5 and Frame6. Frame6 is a current time plane image, and Frame1 to Frame5 are consecutive time plane images before the current time plane image. A red arrow indicates a determined sliding direction.

In the embodiments of the present disclosure, the computing device 200 generates the time plane images continuously. After the sliding direction of the hand has been determined in Frame6, the computing device 200 returns to perform Step S440 to determine active pixels in a time plane image Frame7; when the quantity of active pixels is within the predetermined range, the computing device 200 determines the sliding direction of the hand in accordance with Frame2, Frame3, Frame4, Frame5, Frame6 and Frame7, and so on. When the quantity of active pixels is not within the predetermined range, the computing device 200 leaves the hand sliding direction identification state and returns to perform Step S410.

In addition, in some other embodiments of the present disclosure, after entering the hand sliding identification state, when the sliding direction of the hand fails to be determined within a predetermined time period, the computing device may also enter the gesture identification state (i.e., return to Step S410) to generate the time plane images again and identify the gesture.

In the method according to the embodiments of the present disclosure, there are two identification states, i.e., the gesture identification state and the hand sliding identification state.

In the gesture identification state, the input image (i.e., the processed image) is a rough outline of a moving object generated in accordance with the event data, so it is able to prevent the occurrence of any interference caused by such redundancy information in a conventional CIS image as background information to the greatest extent. As compared with a conventional gesture identification algorithm based on a Convolutional Neural Network (CNN), it is able to remarkably improve the identification accuracy and speed.

In the hand sliding identification state, through the time plane images, it is unnecessary to separate foreground information from background information, so it is able to improve the calculation speed. In addition, it is able to calculate the movement speed and the movement direction of the pixel in accordance with the timestamp information about the event data, without any necessity to obtain an optical flow through heavy, complex calculation, so it is able to remarkably reduce the computational burden.

Moreover, usually the user's hand moves quickly, and the motion blur easily occurs in the CIS image. At this time, the algorithm is not effective. However, in the embodiments of the present disclosure, the motion blur does not occur in the case of rapid movement. Actually, the more quickly the hand moves, the more the event data and the fewer the computational errors.

It should be appreciated that, although with a large number of details, these specific details are not necessary for the implementation of the present disclosure. In some embodiments of the present disclosure, the known method, structure or technology is not shown, so as to facilitate the understanding of the present disclosure in a better manner.

It should be further appreciated that, sometimes the features of the present disclosure are described in conjunction with a single embodiment or figure, so as to facilitate the understanding of one or more aspects of the present disclosure. However, the method in the present disclosure shall not be construed as to reflect the intention that the present disclosure asks for more features than those specified in each claims. More definitely, as reflected in the appended claims, the creative aspect lies in the features less than all the features in the above-mentioned single embodiment. Hence, each claim following a specific embodiment may be definitely incorporated into the specific embodiment, and each claim itself may serve as an individual embodiment of the present disclosure.

It should be further appreciated that, modules, units or components in the above examples may be arranged in the device described in the embodiments, or in one or more devices different from the device. The modules may be combined into one module, or each module may be divided into a plurality of submodules.

It should be further appreciated that, the modules may be modified adaptively and arranged in one or more devices different from that mentioned hereinabove. The modules, units or components may be combined into one module, unit or component, or each module, unit or component may be divided into a plurality of submodules, subunits or subcomponents. Apart from the features, processes or units conflicting with each other, all the features, processes or units involved in the specification (including the appended claims, abstract and drawings) may be combined in any form. Unless otherwise defined, each feature in the specification (including the appended claims, abstract and drawings) may be replaced with a same, equivalent or similar feature.

In addition, it should be further appreciated that, although some embodiments include some features in the other embodiments, the combination of the features in different embodiments may also fall within the scope of the present disclosure. For example, the features in the appended claims may be combined in any form.

In addition, some of the embodiments have been described as a combination of methods or method elements capable of being implemented by a processor of a computer system or any other device. Hence, the processor including necessary instructions for implementing the methods or the method elements may be used to form a device for implementing the methods or the method elements. In addition, the device is used to achieve functions of the elements.

Unless otherwise defined, such ordinal numerals as "first", "second" and "third" are merely used to differentiate different components rather than to represent any order, number or importance.

Although with the above embodiments, a person skilled in the art may obtain the other embodiments, which also fall within the scope of the present disclosure. In addition, it should be appreciated that, the words are selected in the present disclosure principally for readability and guidance, but shall not be construed as limiting the scope of the present disclosure. Obviously, a person skilled in the art may make further modifications and improvements without departing from the spirit of the present disclosure. The above description is for illustrative but not restrictive purposes, and the scope of the present disclosure shall be subject to the appended claims.

What is claimed is:

1. A method for identifying a sliding direction of a hand, comprising:
    generating at least one time plane image in accordance with a series of event data from a dynamic vision sensor, each event being triggered in accordance with movement of an object relative to the dynamic vision sensor in a field of view;
    identifying a gesture in the time plane image;
    in the case that the identified gesture is a predetermined gesture, entering a hand sliding identification state;
    determining active pixels indicating the sliding of the hand in a corresponding time plane image in the hand sliding identification state; and
    determining the sliding direction of the hand in accordance with the active pixels,
    wherein the determining the sliding direction of the hand in accordance with the active pixels comprises: in the case that a quantity of active pixels is within a predetermined numerical range, calculating an average pixel position of the active pixels; determining a variance and a deviation direction of the average pixel position in accordance with a current time plane image and a predetermined quantity of consecutive time plane images before the current time plane image; and determining the sliding direction of the hand in accordance with the variance and the deviation direction,
    wherein the determining the variance and the deviation direction of the average pixel position in accordance with the current time plane image and the predetermined quantity of consecutive time plane images before the current time plane image comprises: determining the variance in accordance with a difference between an average pixel position in the predetermined quantity of consecutive time plane images and an average pixel position in the current time plane image; dividing the predetermined quantity of consecutive time plane images into two parts; and determining the deviation direction in accordance with a different between a sum of the average pixel positions in a first part of the time plane images and a sum of the average pixel positions in a second part of the time plane images.

2. The method according to claim 1, wherein the determining the active pixels indicating the sliding of the hand in the corresponding time plane image in the hand sliding identification state comprises:

calculating a movement speed of each pixel in the corresponding time plane image in the hand sliding identification state; and determining the active pixels in accordance with the movement speed of each pixel, the active pixels being used to indicate the sliding of the hand.

3. The method according to claim 2, wherein the calculating the movement speed of each pixel in the corresponding time plane image comprises determining the movement speed of each pixel in accordance with a pixel value of a pixel adjacent to a pixel.

4. The method according to claim 1, wherein the determining the sliding direction of the hand in accordance with the variance and the deviation direction comprises:

in the case that a variance in a X-axis direction is greater than a variance in a Y-axis direction and a deviation direction relative to the X-axis direction is greater than a first predetermined value, determining that the hand slides to left;

in the case that the variance in the X-axis direction is greater than the variance in the Y-axis direction and the deviation direction relative to the X-axis direction is smaller than a negative value of the first predetermined value, determining that the hand slides to right;

in the case that the variance in the X-axis direction is smaller than the variance in the Y-axis direction and a deviation direction relative to the Y-axis direction is greater than a second predetermined value, determining that the hand slides upward; and in the case that the variance in the X-axis direction is smaller than the variance in the Y-axis direction and a deviation direction relative to the Y-axis direction is smaller than the second predetermined value, determining that the hand slides downward.

5. The method according to claim 1, wherein subsequent to entering the hand sliding identification state, the method further comprises, in the case that the sliding direction of the hand is not determined within a predetermined time period, returning to a gesture identification state and identifying the gesture again.

6. The method according to claim 1, wherein the identifying the gesture in the time plane image comprises:

processing pixels in the time plane image so as to obtain a processed image; and identifying the gesture in the processed image.

7. The method according to claim 1, wherein the event data comprises a coordinate position and a timestamp of each triggered event, wherein the generating the at least one time plane image in accordance with a series of event data from the dynamic vision sensor comprises:

creating an initialization image for each piece of event data;

searching for a coordinate position of each triggered event in the piece of event data in the initialization image; and updating a pixel value of the coordinate position in accordance with a timestamp of the triggered event so as to generate the time plane image.

8. The method according to claim 1, wherein the predetermined numerical range is associated with a resolution of the time plane image.

9. A computing device, comprising one or more processor, a memory, and one or more programs stored in the memory, wherein the one or more programs is executed by the one or more processors so as to implement the method according to claim 1.

10. A system for identifying a sliding direction of a hand, comprising the computing device according to claim 9, and a dynamic vision sensor coupled to the computing device, and configured to trigger an event in accordance with movement of an object relative to the dynamic vision sensor and output an event data flow to the computing device.

11. An intelligent device, comprising the system according to claim 10.

12. A computer-readable storage medium storing therein one or more programs, wherein the one or more programs is executed by a computing device so as to implement the method according to claim 1.

\* \* \* \* \*